Nov. 27, 1951     A. O. FINK ET AL     2,576,288
METHOD AND APPARATUS FOR FILTERING
Filed Dec. 30, 1947     5 Sheets-Sheet 1
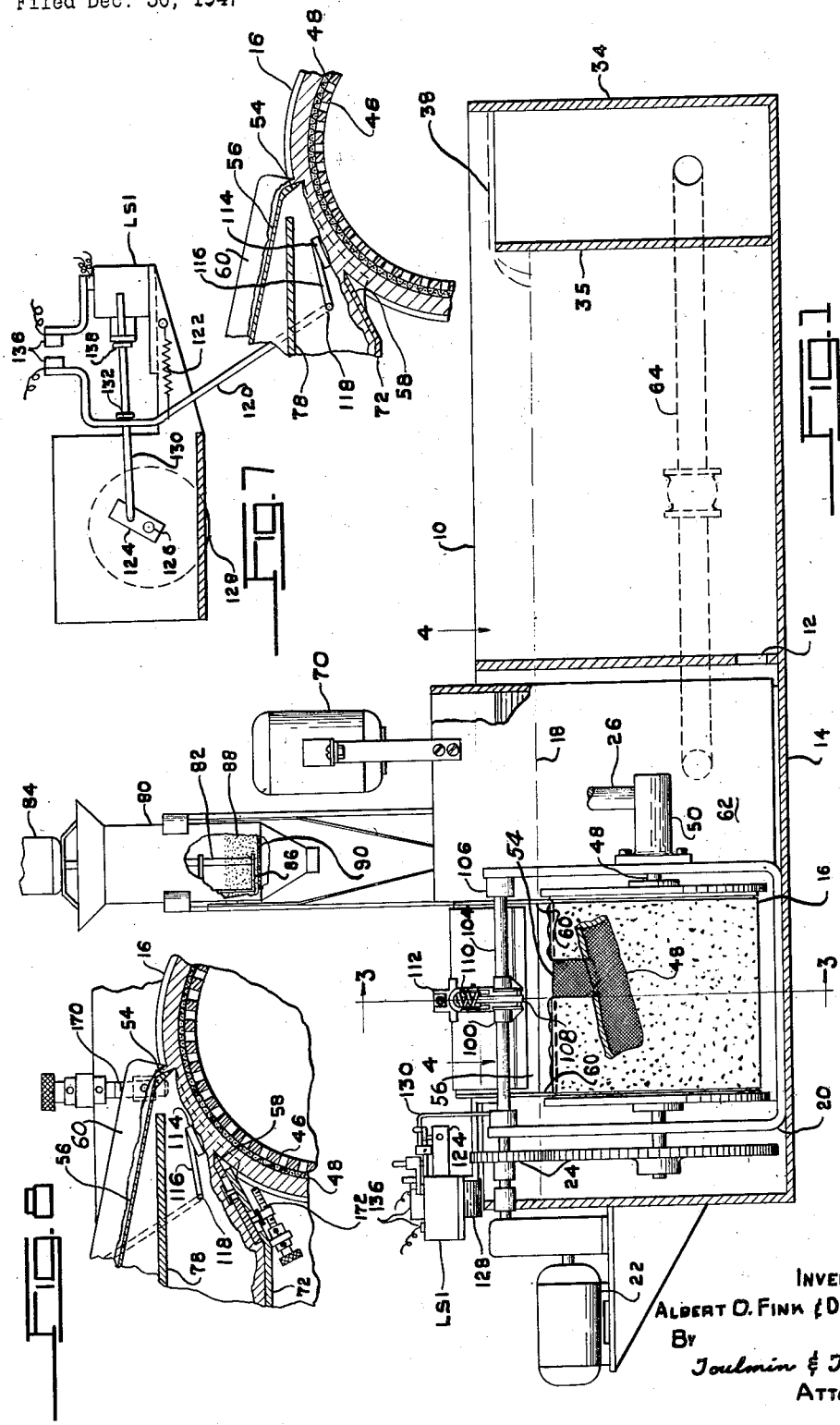
INVENTOR
ALBERT O. FINK & DAVID E. BENCH
By
Toulmin & Toulmin
ATTORNEYS

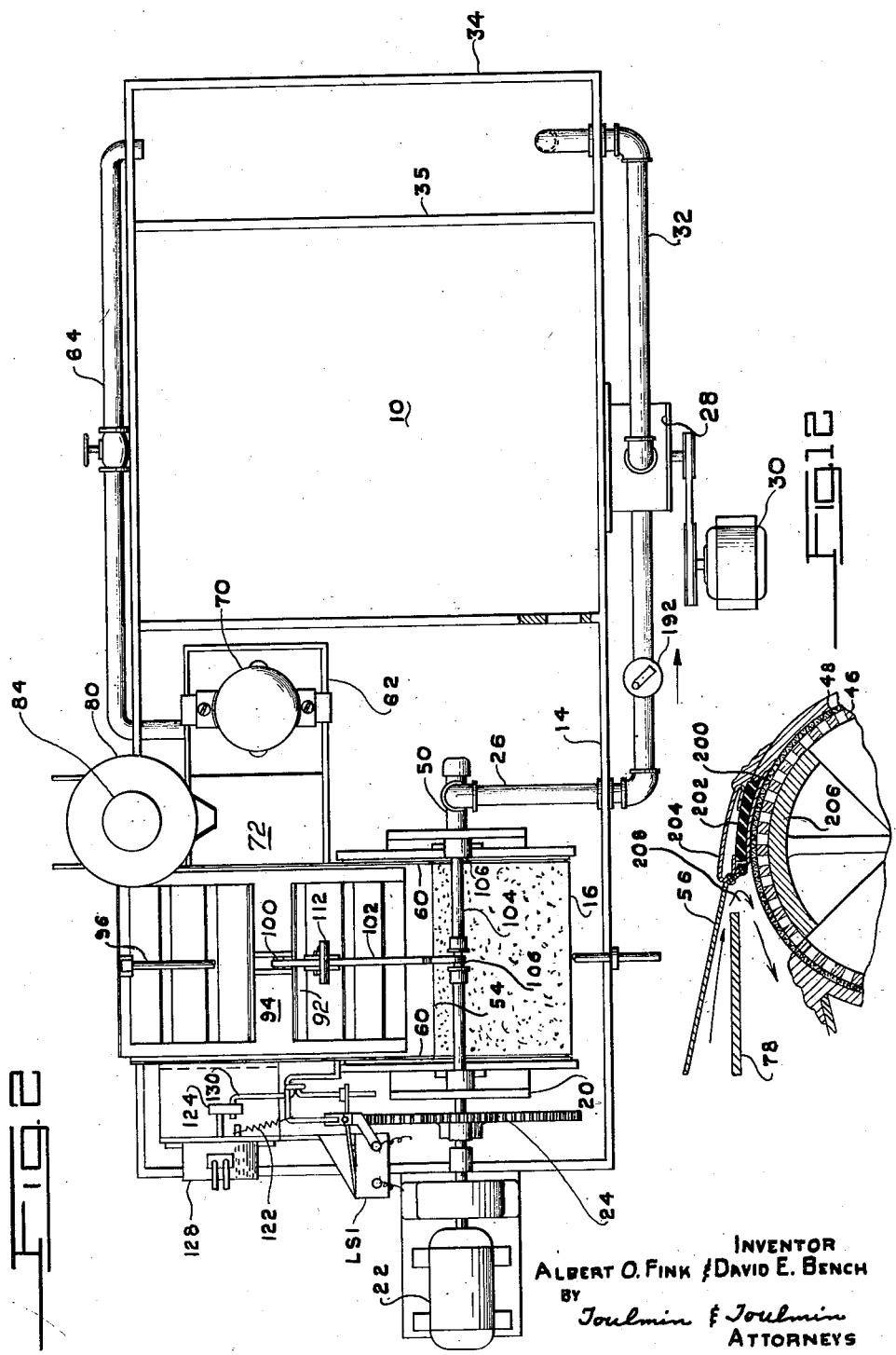

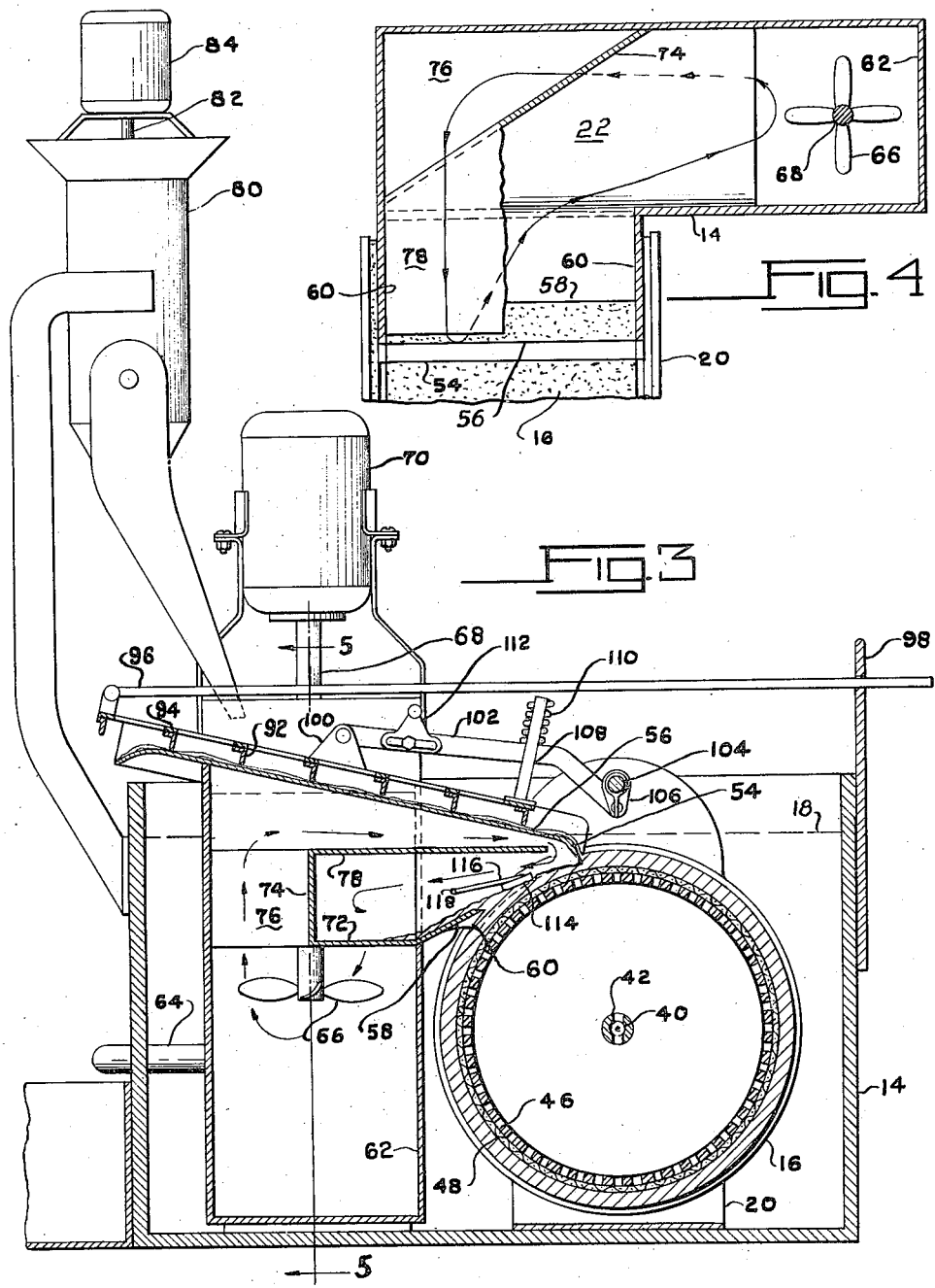

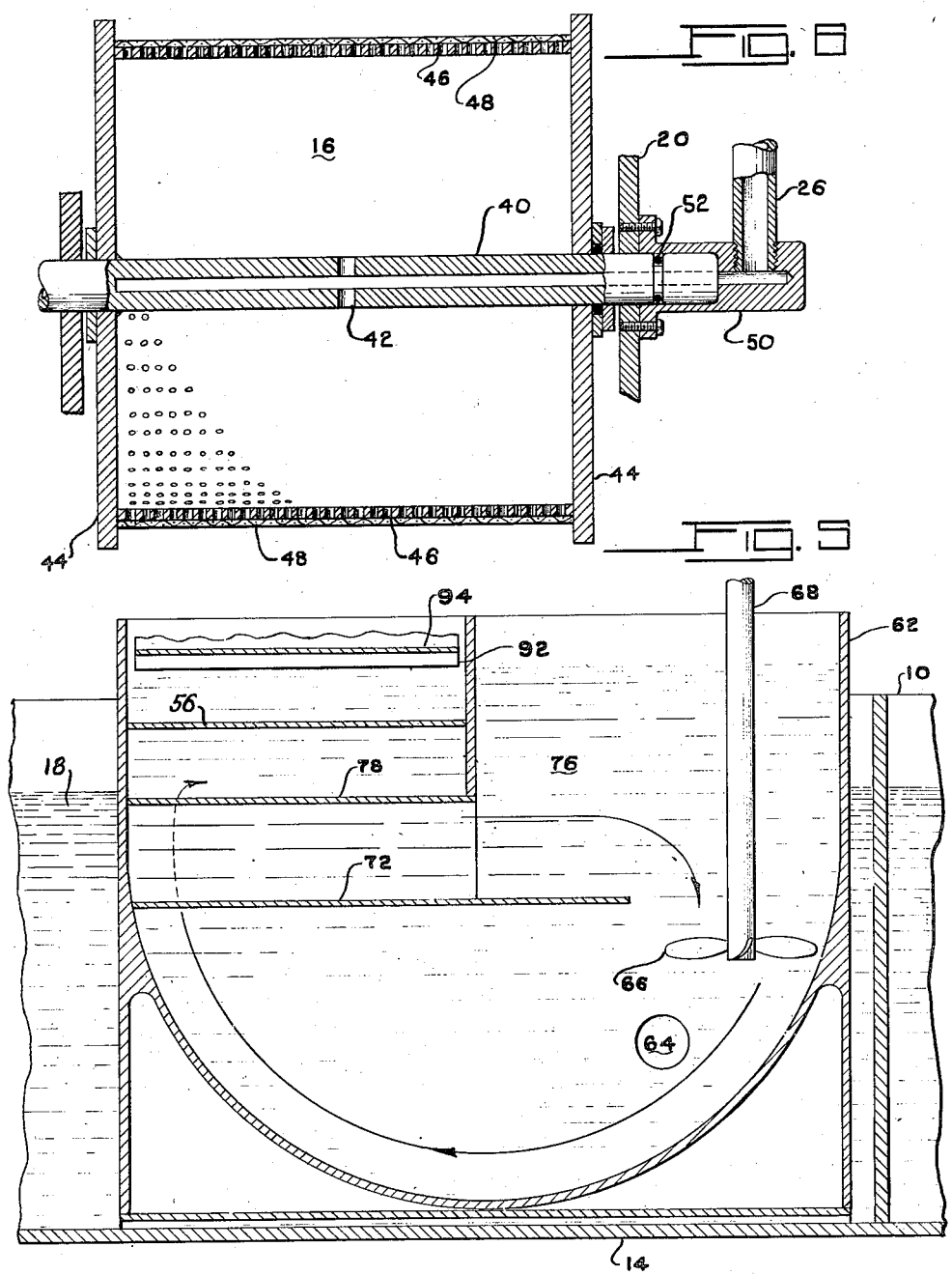

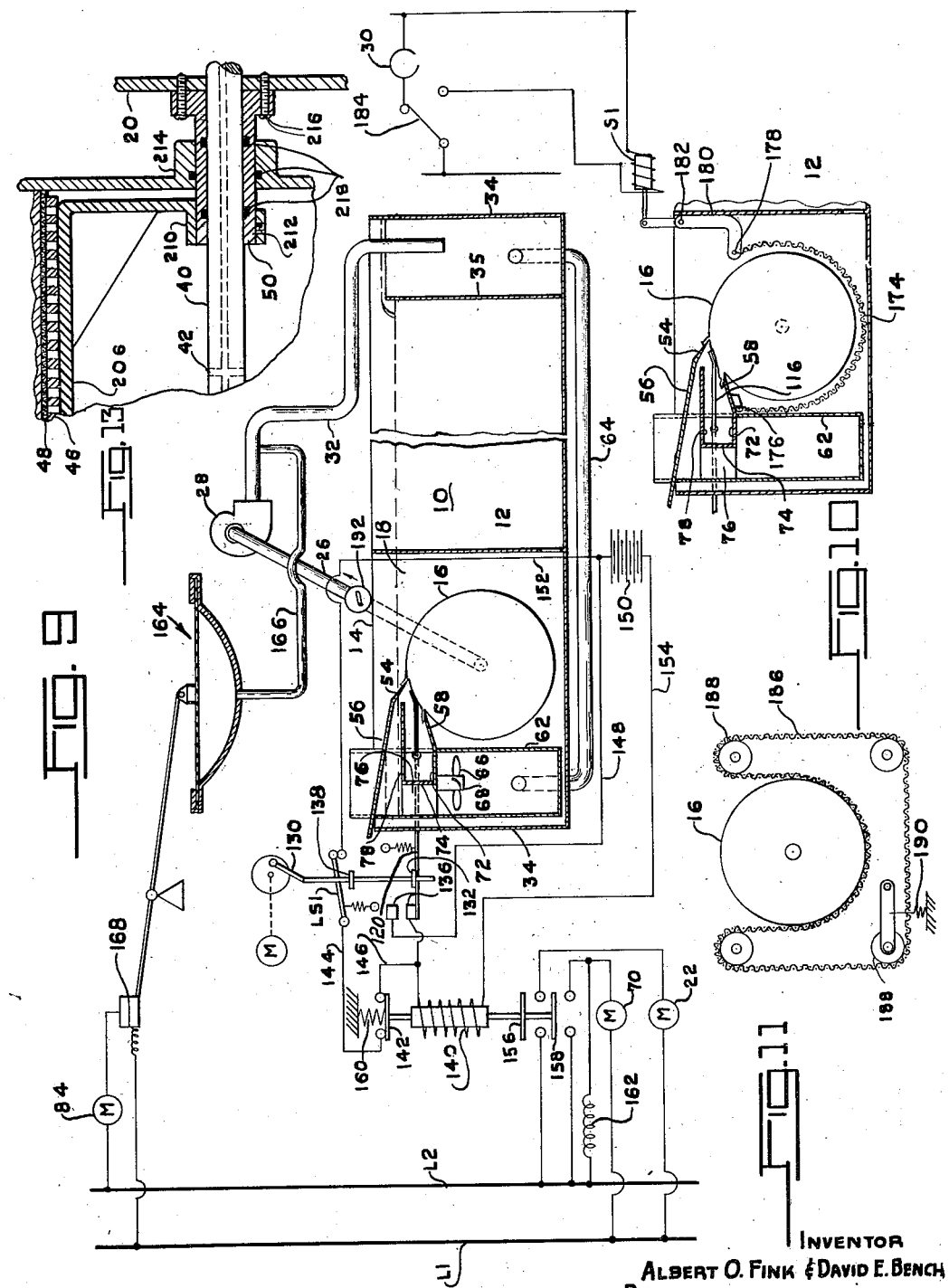

Patented Nov. 27, 1951

2,576,288

UNITED STATES PATENT OFFICE 2,576,288

METHOD AND APPARATUS FOR FILTERING

Albert O. Fink and David E. Bench, Dayton, Ohio, assignors, by mesne assignments, to The Commonwealth Engineering Company of Ohio, Dayton, Ohio, a corporation of Ohio Application December 30, 1947, Serial No. 794,634

22 Claims. (Cl. 210—201)

This invention relates to filters, and particularly to automatically operable vacuum filters, and to methods for carrying out automatic filtering cycles under vacuum.

Most filtering operations are essentially batch type processes. This means that a filtering cycle is carried out for a certain length of time and then is discontinued while readjustments are made in the filtering device. Such readjustments generally consist of washing, removing, or renewing the filtering surface of the filtering member. During this washing, replacing or renewing operation the filtering device is either idle or has placed therein another filtering member in clean condition.

Certain attempts have been made, especially in connection with vacuum filters, to provide for a continuously operating device by associating with the filtering device the filtering surface renovating or renewing mechanisms.

Such attempts generally took the form of placing within the filtering device a station wherein the filter cake was washed or otherwise treated. Since an operation of this nature on the filtering cake was necessarily completely disassociated from the filtering operation, generally taking place in the atmosphere, this required that a certain portion of the filtering member be blocked off. This was generally accomplished by utilizing internal valve means to isolate that portion of the cake or surface of the filtering member being treated from the remainder thereof and having flow pasages for wash water or air.

By carrying out the cake treatment in the atmosphere a considerable part of the filtering surface of the device is idle, and there is also introduced the possibility of leakage, contamination, cake cracking or dislodging, or, in the case of a non-packing cake, complete disintegration thereof.

Most filtering operations are best carried out in connection with a filtering member whose action is augmented by the use of cake forming materials which are generally entitled filter aids.

Filter aids are generally solid substances in finely divided form which deposit over the filtering member and form a cake which is finely porous and which is effective to remove the substance from the fluid being filtered which it is desired to retain on the filter cake.

It will be obvious that the nature of the substance being employed as a filter aid will depend on the nature of the fluid being filtered and the substance to be removed therefrom.

While some filter aid substances will form a hard cake on a filtering member the best filter aids will form a cake which is solid and as dense as the filtering operation requires but which, at the same time, does not form a hard cake in which the particles adhere to one another.

While this is the preferred form of filtering cake it introduces the problem of supporting the cake on the filtering member when there is no fluid flow through the cake tending to support it against the filtering member support.

In the present type filtering devices it is necessary either to employ a cake forming filter aid which will be self-supporting, in which case the benefits of the preferred type cake are lost, or to permit the cake to fall from the filtering member each time the filter is shut down.

The primary object of the present invention is to provide a method and apparatus for filtering which overcomes all of the aforementioned objections to prior art filters.

A still further object of this invention is the provision of a filtering device which is fully automatic in operation and which utilizes to the greatest extent the filtering capacity of the filter member.

A still further object of this invention is to provide an automatic filter which is idle during the periods that the flow rate through the filter is above a predetermined amount.

A still further object of the present invention is to provide a method and apparatus for filtering through a filter cake so arranged that the cake is continuously renovated thereby producing a continuous filter action.

It is also an object of this invention to provide a method and apparatus for automatic filtering in which the residue which accumulates on the filter cake is continuously removed and permitted to drain and is then discharged from the filtering device.

A still further object is the provision of a vacuum type filter having a cake formed thereon of filter aid material and in which the said cake is prevented from dropping from the filter drum when the filter is shut down and there is a loss of vacuum within the said drum.

It is another object of this invention to provide a drum type vacuum filter wherein the vacuum within the drum assists in recoating the said drum with the proper thickness of filter cake after the residue from the periphery of the drum has been removed.

These and other objects and advantages will become more apparent upon reference to the following description taken in connection with the accompanying drawings in which:

Figure 1 is a vertical section taken through a filtering device according to this invention and in connection with a tank containing fluid which is to be filtered;

Figure 2 is a plan view of the dervice shown in Figure 1;

Figure 3 is a vertical section indicated by the line 3—3 on Figure 1;

Figure 4 is a plan view indicated by the line 4—4 on Figure 1;

Figure 5 is a vertical section indicated by the line 5—5 on Figure 3;

Figure 6 is a vertical section taken through the filtering drum;

Figure 7 is a fragmentary view showing the arrangement of the control device for regulating the rotation of the filter drum according to the thickness of the filter cake thereon;

Figure 8 is a fragmentary view showing how the cake applied to the filter drum can be regulated in thickness;

Figure 9 is a diagrammatic view showing the filter in section and showing the control system associated therewith for effecting full automatic operation of the device;

Figure 10 is a fragmentary view showing one manner of supporting the cake on the filter drum during the time the filter is idle;

Figure 11 shows still another arrangement wherein the filter cake is continuously supported;

Figure 12 is a fragmentary view showing another form of scraper blade for use at the leading edge of the recoating chamber; and Figure 13 is a sectional view showing the arrangement of the internal shield or mask employed in Figure 12.

Referring to the drawings, there is shown therein the filter of the present invention in connection with a processing tank containing fluid which is to be filtered.

This processing tank may include any of several work operations such as an electroplating cycle and is merely for the purpose of demonstrating that this invention is adapted for use in connection with a work cycle of that nature.

In the drawings the processing tank is indicated at 10 and it communicates by means of an aperture 12 in the bottom thereof with an adjacent tank 14 which is a part of the filter proper.

The filter proper according to this invention includes a drum 16 which is completely submerged within the liquid within the tank at the normal liquid level. This is indicated by the liquid level represented by the line 18.

The drum 16 is rotatably supported in a framework 20 and is adapted for being driven in rotation by a motor 22 which is connected with the said drum through the gearing 24.

As will be seen in Figures 1 and 2 there is connected with the drum a conduit 26 which leads to a pump 28 that is driven by the motor 30. The discharge side of the pump 28 is connected by a conduit 32 with the compartment 34 at the right end of the processing tank 10. The compartment 34 is formed by a wall 35 which extends above the normal liquid level of the tank 10 thereby providing for a liquid level within the compartment as indicated at 38 in Figure 1.

The reason for the compartment 34 having a higher liquid level than the tank 10 will become apparent hereinafter.

The manner in which the drum 16 is constructed is better shown in Figure 6 wherein it will be seen that the drum comprises a hollow center shaft 40 which includes the radial bores 42 by means of which the hollow interior of the shaft communicates with the interior of the drum.

The drum includes the head members or end plates 44 mounted on the shaft 40 and between which extend the cylindrical supporting member 46. The member 46 is perforated with a plurality of holes whereby fluid flow can take place to the interior of the drum.

Passing around the supporting member 46 is a cloth or screen 48 which is for the purpose of providing direct support for the filter cake deposited on the drum. It will be understood that the size and number of perforations in the member 46 and the mesh and material of the cover 48 will be determined by the nature of the filtering process which is to be carried out.

The end of the shaft 40 at the end of the drum opposite the gearing 24 terminates in a stub part which telescopes with a hollow member 50 which is connected with the conduit 26. Suitable sealing means such as the resilient annular ring 52 effect a seal between the shaft 40 and the member 50 to permit a high vacuum to be drawn within the drum.

Due to the fact that the drum is submerged within the liquid tank 14 it is unnecessary to provide the interior of the drum with any valving and the entire drum surface is thus subjected to the action of the vacuum therein.

This invention contemplates continuous renewal of the filter cake on the drum. To this end, when the drum rotates the residue accumulated on the surface of the cake and a certain portion of the cake are removed therefrom. Immediately following this action a new supply of filter aid is supplied to the surface of the drum so that the cake can be restored to its original thickness. As mentioned before, the material employed for building up the cake on the drum can comprise any of several substances, such as carbon, sand, gels of various types, or any of the several diatomaceous earths.

The removal of the residue from the surface of the drum is accomplished by a scraping knife 54 which is positioned to bear against the surface of the cake on the drum adjacent the top thereof. The knife 54 is a portion of an inclined table 56 which extends upwardly out of the liquid of the tank 14 and over the edge of the said tank. The table is preferably supported on the edge of the tank by means of brackets or the like. The residue and filter cake which are removed from the drum are thus forced on to the table 56, from whence they are removed over the edge of the tank and discharged into any suitable container.

The inclined table 56 acts as a drain board and permits substantially all of the filtrate to drain from the residue and cake before it is finally discharged permanently.

Circumferentially spaced from the scraper blade 54 is a second scraper blade 58. The blade 58 is at a greater radial distance from the center of the drum than is the blade 54 and is adjusted so that the drum in leaving the blade 58 will have exactly the proper thickness of cake thereon. The blade 58 is preferably supported on the chamber 62 and may be made adjustable as shown in Figure 8.

For supplying new cake to the surface of the drum between the blades 54 and 58, the said blades are connected with end plates 60 which bear against the surface of the cake on the drum at the ends of the blades 54 and 58. These end plates may be rigidly supported in any suitable manner relative to the drum such as by being integral with the tank 62 as seen in Figure 4. The end plates together with the blades 54 and 58 define a recoating chamber which opens directly against the surface of the drum. A recoating slurry of the proper concentration supplied to this chamber will be operative to rebuild the coat on the drum due to the action of the vacuum within the drum. This is due to the fact that the said vacuum will draw the liquid from the slurry through the surface of the drum and cause the solid material suspended therein to deposit on the drum.

The slurry for recoating the drum is provided by supplying fluid to the recoating chamber and by adding thereto a suitable amount of solid filter aid. The chamber communicates with a tank 62 which may set directly within the tank 14 and which has its walls substantially higher than the liquid level in the tanks 10 and 14.

For supplying fluid to the tank 62 there is a conduit 64 which leads to the compartment 34 at the end of the processing tank 10. Due to the fact that the liquid level in the compartment 34 is above that in the tanks 10 and 14, the liquid level in the tank 62 will also be substantially above that in the tanks 10 and 14. The purpose of this will become more apparent hereinafter and is to insure a greater pressure within the recoating chamber than is standing on the fluid outside the chamber, thereby preventing the entrance of contaminated fluid to be filtered in the tank 14 into the chamber and contamination of the recoating slurry.

Inasmuch as the slurry in the tank 62 and the recoating chamber consists of a suspension of solid material in a liquid, it is preferable that the slurry be agitated in order to maintain a uniform suspension and to prevent the filtrate from precipitating to the bottom of the slurry tank. Accordingly, there is mounted within the tank 62 a propeller or any other suitable type of agitator 66 which is mounted on a shaft 68 leading to a drive motor 70. The recoating chamber communicates with the tank 62 at somewhat above the center thereof and, as will be seen in Figure 4, is so arranged that the propeller 66 will cause the fluid to circulate through the recoating chamber and back to the tank 62. This is accomplished by extending the lower scraper blade 58 horizontally across the tank 62 as at 72 and erecting the vertical partition 74 which is cut off at an angle in order to define the triangular passage 76 best seen in Figure 4.

Then, extending horizontally from the top of the partition 74 is a horizontal partition or baffle member 78 which extends over to beneath the right end of the inclined table 56 as seen in Figure 3. The baffle 78 is brought to a position fairly close to both the table 56 and the surface of the drum within the recoating chamber. This brings about this passage of fluid through the recoating chamber as indicated by the arrows in Figure 3 and prevents any accumulation of precipitated filter aid within the chamber. A uniform suspension throughout the tank 62 and recoating chamber is thus maintained at all times.

For supplying the solid material to the chamber 62 there is provided some suitable form of solid feeding device such as the hopper 80 which is mounted above the tank 62 and which is operable to discharge material thereto upon rotation of the shaft 82 within the hopper by the motor 84.

Rotation of the shaft 82 is effective to discharge material from the hopper by means of the member 86 carried on the shaft 82 and which forces the filter aid material 88 through the screen 90 in the bottom of the hopper.

The principle of operation of the device shown in the drawings is like that of a flour sifter wherein the filter aid material will pass through the screen as long as the member 86 rotates but will be supported by the screen whenever the said member ceases to rotate. It will be understood, however, that any of several other devices could be employed for bringing about the feeding of the solid material to the tank 62. The essential feature in connection with the filter aid feeding device is that the discharge of material to the slurry tank be controlled.

Returning to the discharge of the residue and the filter cake removed from the drum by the leading scraper blade 54, the device for moving the substance up the inclined drain board 56 comprises a ladder like device having a plurality of transverse members 92 interconnected by the longitudinal member 94. The end of the member 94 at the discharge end of the table 56 is pivoted to a rod 96 which extends across the top of the tank 14 and is slidably supported in an upstanding bracket 98. Intermediate the ends of the member 94 is a bracket 100 to which is pivoted an arm 102 that extends backwardly to the shaft 104 with which it is connected by the crank member 106. The end of the member 94 adjacent the blade 54 has an upstanding part 108 between which and the arm 102 there bears a spring 110. With the arm 102 in the position shown the lower end of the member 94 is lowered to bring the transverse parts 92 against the table 56. However, when the shaft 104 and the crank 106 rotate to raise the arm 102, the spring 110 and projecting part 108 lift the lower end of the member 94 and raise the transverse parts 92 from the table. In order to raise the upper end of the member 94 there is an abutment 112 carried on the arm 102 and which engages the rod 96 when the arm 102 moves upwardly.

It will be apparent that rotation of the shaft 104 will bring about rotation of the crank 106 and alternate raising and lowering of the arm 102 for alternately raising and lowering the ladder like discharge device. Simultaneously with the raising and lowering of the discharge device it is oscillated along the length of the discharge board 56. This brings about gradual moving of the residue up the discharge board, but at such a rate that there is adequate time for the filtrate to drain therefrom back to the tank 14. It will be seen in Figure 1 that the shaft 104 is connected to be driven by the motor 22 so as to rotate simultaneously with the drum 16.

During the period that the filter drum is rotating for continuously renewing the filter coat it is essential that the proper thickness of filter coat be built up in the recoating zone. To insure that the drum will not rotate more rapidly than this coat can be applied, the rate of rotation of the drum is directly controlled by the thickness of the filter coat in the recoating zone. For effecting this control there is a detector or feeler mechanism which engages the filter cake within the recoating zone and a switch mechanism controlled thereby which controls the driving of the drum.

The aforementioned feeling or detecting device is shown in Figure 7 wherein it will be seen that there is a foot or shoe 114 which is carried on a rod 116 that is pivoted in one of the side plates 60 as at 118. The rod 116 outside the chamber extends upwardly as at 120 so that movement of the part 120 will move the feeler member toward or away from the surface of the filter cake.

Due to the fact that within the recoating zone there is a movement of fluid through the filter cake and the concomitant deposition of filter aid on the surface of the cake there is some tendency for the detector member or feeler 114 to become covered with the filter aid if it is permitted to ride stationarily on the surface of the drum. Also, if the drum were to be stationary while the cake is building up and the feeler or detector were to bear stationarily against the cake, it would not operate to detect the increased thickness of the cake brought about by the depositing of the filter aid thereon. Accordingly, it is preferable to continuously oscillate the member 114 to and from the surface of the filter cake. This provides for a true feeling action of the member and prevents the deposited filter aid from building up around the feeler.

Oscillation of the feeler is accomplished by giving it a spring bias by the spring 122 in a direction to move the feeler member toward the cake surface. A crank member 124 is mounted on a motor shaft 126 of a continuously operating motor 128 and is connected with a reciprocating member 130. The reciprocating member 130 carries a collar 132 which is adapted for engaging the extended part 120 of the rod connected with the feeler and to move the said rod opposite the direction in which it is biased by the spring 122. By continuously driving the motor 128 the feeler is continuously oscillated toward and away from the cake surface.

As mentioned before, the rotation of the drum is controlled by the feeler member. This is accomplished by a switch arrangement which permits energization of the drum drive motor 22 only when the cake within the recoating zone is of the proper thickness. To accomplish this function there are a pair of switches, one of which is indicated at LS1 in Figure 7, and the other of which consists of a pair of spaced contacts 136 one of which is stationary and one of which is carried on the part 120 of the feeler supporting rod.

In operation, if the cake is too thin the contacts 136 are brought together to energize a relay 140. This relay has a holding circuit through wires 144 and 146 and blade 142 and which circuit also includes the limit switch LS1. During the time that the feeler is approaching the cake to detect the thickness thereof, the limit switch LS1 is opened by the collar 138 on the rod 130. If the cake is too thin the contacts 136 will be closed at this time so that opening of the switch LS1 will not operate to de-energize the aforementioned relay. However, if the cake is of sufficient thickness the contacts 136 will not be closed and opening of the switch LS1 will bring about de-energization of the relay. The drum drive motor is so connected with the relay that the said motor will be energized when the relay is de-energized and will be de-energized when the relay is energized.

The arrangement of the switch LS1 and the contacts 136 with the drum drive motor is better illustrated in Figure 9 wherein the relay referred to above is identified by the reference numeral 140. The holding circuit for the said relay is effected through a blade 142 thereof which is connected by the wire 144 with the switch LS1 and by the wire 146 with one of the contacts 136. The other of the contacts 136 is connected by a wire 148 at one side of a source of electric power 150, while another wire 152 connects the same side of the source of electric power with one side of the switch LS1. The other side of the source of power 150 is connected by a wire 154 with one end of the winding of the relay 140 while the other end of the said winding is connected with the wire 146.

The relay includes the blades 156 and 158. Upon de-energization of the relay a biasing spring 160 will move it to close the circuits associated with the blades 156 and 158. The blade 156 is connected between the power lines L1 and L2 and in series with the drum drive motor 22, while the blade 158 is similarly connected between the power lines and in series with the agitator motor 70.

Since it is desirable to maintain the slurry in the slurry tank in a state of agitation at all times the switch blade 158 is bypassed by a suitable impedance 162 which permits operation of the motor 70 at all times but at reduced speed except when the blade 158 is closed.

As previously mentioned, it is desired only to operate the filtering device in its filter cake renovating cycle during the time that the flow rate therethrough is reduced below a predetermined minimum amount. So long as the rate of fluid flow through the filter is adequate for the purpose for which the filter is being employed, it is unnecessary to effect any coat renovating operations. However, when the rate of fluid flow through the filter is reduced to a predetermined minimum, this is detected by means of the diaphragm device identified by the reference numeral 164. This device is connected by a conduit 166 with the discharge conduit 32 of the pump 28.

Associated with the diaphragm device is a switch 168 which is adapted for being opened when the pressure in the diaphragm device is above a predetermined amount and for being closed when the pressure in the diaphragm device falls below a predetermined amount.

Thus, the switch 168 is open when the flow rate through the filter is above a predetermined value and is closed whenever it falls below a predetermined value. The switch 168 is connected between the power lines L1 and L2, and in series with the motor 84 associated with the filter aid dispenser.

It will be apparent from the foregoing that the immediate result of a reduction of flow rate through the filter beyond a predetermined amount is to commence operation of the dispenser motor 84 which leads to an addition of a solid filter aid material to the tank 62.

*Operation*

In operation, let it be assumed that the filter drum has deposited thereon a filter cake of the proper thickness and that the pump 28 is in operation drawing fluid from the inside of the drum and delivering it to the compartment 34. This cake, which may consist of diatomaceous earth or of a commercial filter cake building material, may be initially deposited on the drums by merely throwing the cake forming material into the tank 14 while the circulating pump is in operation. The fluid overflows from the compartment 34 into the tank 10 and thereafter passes through the aperture 12 to the tank 14, whence it is drawn through the filter drum and again passes through the circulating pump.

The tank 62 is provided with fluid from the compartment 34 and stands at the same level as the fluid therein.

Let is be further assumed that the tank 62 contains substantially clear liquid so that there is no filter aid being deposited on the surface of the drum in the recoating zone. At this time the drum is stationary and the only operation which is taking place is the circulating of fluid through the system and the continuous oscillation of the feeler member 114.

If, now, due to the operation of the processing steps taking place in the tank 10, a residue builds up on the surface of the filtering drum, the flow rate through the pump will gradually reduce due to the clogging of the passages through the filter cake by the said residue.

When the fluid rate through the pump is reduced to a predetermined amount the pressure in the conduit 32 drops and permits the diaphragm device 164 to contract thereby closing the switch 168. When the switch 168 closes, the dispenser motor 84 commences to operate and filter aid is displaced from the hopper 80 to the tank 62.

With filter aid added to the tank 62 and thoroughly admixed with the fluid therein by the operation of the agitator propeller 66, a supply of recoating slurry is carried to the recoating zone between the scraper blades. When this slurry is supplied to the zone the cake on the drum commences to build up therein and this increased thickness of cake is detected by the oscillating member 114. The cake in the recoating zone will continue to build up and the feeler member will continue to oscillate until the said cake is thick enough that the contacts 136 will fail to close when the feeler member moves in toward the surface of the drum. As explained before the failure of the contacts 136 to close will permit the opening of the switch LS1 to de-energize the relay 140 thereby to bring about the closing of the blades 156 and 158 thereof. Closing of the said blades will energize the drum driving motor 22 which will start the drum to rotating and will increase the speed of the agitator motor 70. The energization of the motor 22 sets the drum in operation whereby the leading scraper blade 54 commences to remove the residue and a portion of the filter cake from the periphery of the drum. Energization of this motor also commences operation of the ladder like discharging device to move the removed residue and filter cake up the inclined drain board 56.

Due to the fact that the drum is moving through the recoating zone the rate at which filter aid is carried into the recoating zone and deposited on the drum is greatly increased. Because of this it is desirable to increase the agitation of the slurry and to this end the motor 70 increases in speed simultaneously with the energization of the motor 22 as explained above.

Rotation of the drum 16 will continue so long as the cake being built up in the recoating zone is thick enough to prevent the contacts 136 from closing. However, when the drum has rotated a predetermined amount and carried a certain area of clean filter cake from beneath the trailing scraper blade 58, the flow rate through the pump will have been increased to the point that the diaphragm operating device 164 will again open the switch 168. Opening of the switch 168 will deenergize the dispenser motor 84 and stop the addition of solid filter aid to the tank 62.

Following this, the drum will continue to rotate so long as the cake thickness prevents the closing of the contacts 136, but within a relatively short time substantially all of the solid material in the slurry tank will be deposited on the surface of the drum in the recoating zone but without building up a thick enough cake to prevent the contacts 136 from closing. At this time rotation of the drum will halt and will remain halted until additional solid material is fed to the slurry tank.

The action of the filtering device is accordingly completely automatic, but it will be seen that rotation of the filter drum and the removal of the residue and cake therefrom is not a continuous process but is only carried out whenever it is necessary to increase the flow rate through the filter to maintain it above a predetermined capacity. The arrangement of this invention is therefore very economical of power and filter aid.

Due to the varying conditions of operation of filters of this type it may be desirable to remove more or less of the cake during the renovating operation. This may be accomplished by the arrangement shown in Figure 8 wherein the leading scraper blade 54 and the inclined table 56 are arranged to be radially adjustable relative to the drum by means of the screw 170.

Figure 8 also shows the manner in which the lower scraper blade 58 can be adjusted by slidably mounting it on the end of the lower partition 72 of the recoating zone and providing it with an adjusting screw 172 which is operable to move it toward and away from the surface of the filter drum.

In either case the recoating zone is sealed at its leading and trailing edges by the scraper blades 54 and 58 and at the sides by the side blades 60 which, as will be seen in Figures 1 and 7, extend into the cake and preferably somewhat beneath the depth to which the blade 54 scrapes. This gives a sliding contact of the edges of the plates 60 with the surface of the cake and permits the cake to build up on either side thereof to effect a fluid tight seal.

Since the head of the liquid within the entire slurry compartment is greater than that of the fluid in the filtering tank 14, any leakage between the recoating zone and the filtering tank will be from the former to the latter. Leakage of this nature might occur when the cake becomes cracked or damaged for any reason and thus does not seal at the blades 54 and 58 or at the end plates 60. However, due to the provision of a greater pressure within the recoating chamber there will be absolutely no contamination of the recoating slurry at any time.

The type of cake which it is desired to build up on the drum is such that it is necessary to maintain a vacuum within the drum to maintain the cake in position. Thus, if the filter is shut down and the vacuum within the drum is completely lost the filter cake will disintegrate and fall to the bottom of the tank 14.

While, by the arrangement of this invention, it is possible to commence operation with a drum completely barren of filter cake and to build a cake thereon automatically, it is preferable that the filter cake be maintained at all times. For accomplishing this the arrangements shown in Figures 10 and 11 may be employed. These arrangements comprise means for physically supporting the filter cake at least during the time that the filter is not in operation. In Figure 10 this is accomplished by a flexible screen or other flexible perforate member 174 which has one end secured as at 176 to the bottom partition of the recoating zone and has its other end connected as at 178 with a lever 180 which is pivoted at 182 and which is adapted for being rotated in a clockwise direction by a solenoid SI.

The perforate member 174 passes around the drum and is preferably normally slightly spaced therefrom. However, upon energization of the solenoid SI the lever 180 will be rotated and pull the member 174 up against the surface of the drum. This will physically support the cake and prevent it from dropping from the drum.

It will be apparent that the preferable way to actuate the solenoid SI would be to interlock it with the drive motor for the pump so that whenever the pump was shut off the solenoid SI would be energized to actuate the holding means for the cake.

A simple electrical circuit for accomplishing this result is connected with the solenoid SI in Figure 10 and it comprises a switch 184 which, in one position, energizes the drive motor 30 for the pump 28, and in its other position energizes the solenoid SI.

In Figure 11 equivalent results are obtained by mounting an endless perforated belt member 186 in such a manner that it passes around the filter drum and over a plurality of idlers 188.

The screen or perforate member 186 is driven by the drum and moves therewith and continuously offers support to the filter cake. Preferably, one of the idlers is spring urged by a spring 190 in a direction to maintain a predetermined tautness in the member 186.

By either of the devices illustrated in Figures 10 and 11 the filter cake can be prevented from disintegrating and dropping from the drum when the vacuum in the said drum is lost.

Preferably, in combination with the holding devices for the filter cake, the conduit 26 includes a check valve 192 opening from the drum toward the pump 28 and operable to prevent a back rush of fluid from the pump when the same is halted. The check valve in itself will prevent disintegration of the filter cake for a matter of some minutes, and in any case will prevent back washing of the cake which in many cases would be destructive thereto.

*Modifications of Figures 12 and 13*

Some types of filter aid when acted on by a scraping blade such as the blade 54 have a tendency to become glazed over. This is due to the fact that the scraper blade probably crushes some of the particles of filter aid and forces them into the pores of the cake as the drum rotates. Due to this glazing over action of the cake in connection with certain types of filter aid the flow rate through the cake may be materially reduced after a period of operation.

For overcoming this drawback in connection with those types of filter aid which react in this manner, the constructions shown in Figures 12 and 13 may be employed.

In Figure 12 the scraper blade is indicated at 200 and comprises a thin flexible blade which lies over a portion of the surface of the drum 46. The blade 200 fits closely against the drum and is thus operable to remove substantially all of the cake therefrom.

Inasmuch as the blade 200 is quite thin and flexible it is preferable that it be backed up by a resilient member such as the rubber block 202 which exerts pressure over the surface of the blade and holds it against the surface of the drum. A metal clip 204 or other suitable means can be employed for exerting a pressure on the block 202.

Inasmuch as it is desired to remove as much as possible of the cake from the drum as it passes beneath the scraper blade 200, it may be preferable to shield a portion of the drum immediately beneath the said blade as by means of the mask 206. The said mask covers the drum beneath the blade 200 and also extends forwardly and rearwardly from the said blade and is effective to prevent the vacuum within the drum from acting over the shield part. As most filter aid materials depend upon the vacuum within the drum to retain them in cake form thereon, it will be apparent that a masking of a portion of the drum as shown in Figure 12 will permit the cake to loosen thereon and give it a tendency to disintegrate. Because of this loosening of the cake the scraper blade 200 is effective for removing substantially all thereof.

The covering member 48 for the drum is, as mentioned before, preferably a wire screen. Because of the nature of the wire screen and the perforate nature of the drum there will be little hollows and depressions extending over the surface of the drum from which the scraper blade 200 cannot effectively remove the filter cake. For this reason the shield 206 is extended behind the blade 202 and thus masks off the portion of the drum over which the slurry of recoating material is passing as at 208. Since this slurry is being directed toward the surface of the drum as a fairly high velocity jet, it will dislodge the remnants of the filter cake from the drum which has passed beneath the knife blade, pick up the removed particles and direct them into the slurry stream. The cake which is formed on the drum in the recoating chamber is thus substantially new throughout its entire depth.

It will be understood that the actual thickness of filter cake to be built up on the drum in the recoating chamber will be dependent upon the nature of the filtering operation being carried out and the degree of purity which is desired in the filtrate.

The shield 206 may be arranged within the drum as shown in Figure 13 wherein it will be seen that the said shield comprises a hub part 210 which is secured to a sleeve 212 that extends through the hub 214 of the head of the drum at that end.

The sleeve 212 is secured as by the screws 216 to the frame 20 or some other suitable stationary part and acts as a journal for the drum at its outer surface and for the shaft 40 at its inner surface. Suitable sealing means such as the resilient rings indicated at 218 prevent leakage between the sleeve member and the drum or between the sleeve member and the shaft.

In connection with Figures 12 and 13 it is to be observed that the blade 200 is shown considerably thicker than it actually is for the sake of clarity and both the blade 200 and the mask 206 are shown as spanning considerably more of the periphery of the drum than actually occurs.

In practice, the flexible blade 200 would probably be effective if it covered a half an inch of the periphery of a drum that was, say, 4 to 5 inches in diameter. The shield or mask 206 in that case would probably extend from a quarter to a half inch ahead of the leading edge of the blade 200 and from a quarter to a half inch to the rear thereof. It will be apparent from the dimensional description above that the blade and shield mask out only a very minor portion of the surface of the drum.

It will be understood that this invention is susceptible to modification in order to adapt it to different usages and conditions and, accordingly, it is desired to comprehend such modifications within this invention as may fall within the scope of the appended claims.

We claim:

1. In combination; a first tank having liquid therein to be filtered, a second tank hydraulically connected with said first tank and thus having the same liquid level, a rotary drum in said second tank normally completely submerged in the liquid therein and being foraminous, means for drawing a vacuum in said drum to induce fluid flow therein from said second tank, spaced scraper blades bearing on the periphery of said drum, a chamber between said blades opening against the surface of said drum to supply a cake forming slurry thereto, means for supplying a slurry forming material to said chamber, and means for maintaining a pressure in said chamber above that of the liquid in said front tank comprising; a compartment in said first tank having a wall above the liquid level in the said tank, a conduit connecting said compartment with said drum to receive filtered fluid therefrom, said fluid overflowing into the said first tank, and a hydraulic connection from said compartment to said chamber.

2. In combination; a pair of tanks for liquid to be filtered and hydraulically connected at their bottoms, a rotary drum in one of said tanks and normally completely submerged in the liquid therein, a compartment in the other of said tanks having its walls above the liquid level in said tank, a pump connected to draw fluid from within said drum and to supply it to said compartment whereupon the fluid overflows into the tank around said compartment, spaced scraper blades bearing on the periphery of said drum, end plates connecting said blades and forming therewith a chamber opening against the surface of said drum for supplying a cake forming slurry thereto, means for supplying dry cake forming material to said chamber, and means for supplying liquid to said chamber and for maintaining the pressure thereon above that of the liquid in said tanks comprising a hydraulic connection between said chamber and said compartment.

3. In combination; first and second tanks hydraulically connected at their bottoms, means in said first tank forming a compartment having a liquid level above the normal level in said tanks, a rotary perforate drum completely submerged in said second tank, a pump having its inlet connected with the inside of said drum and its outlet connected with said compartment, a first scraper blade bearing on said drum to remove residue and a portion of the filtered cake therefrom as it rotates, a chamber opening against the surface of said drum behind said blade to supply a recoating slurry to the drum, a slurry tank hydraulically connected with said chamber and extending to above the liquid level of said first and second tanks, said chamber and slurry tank being isolated from the liquid in said second tank, a conduit connecting said compartment with said slurry tank to supply fluid thereto, and means for supplying solid filter aid to said slurry tank to form said slurry with said fluid.

4. In combination; first and second tanks hydraulically connected at their bottoms, means in said first tank forming a compartment having a liquid level above the normal level in said tanks, a rotary perforate drum completely submerged in said second tank, a pump having its inlet connected with the inside of said drum and its outlet connected with said compartment, a scraper blade bearing on said drum to remove residue and a portion of the filtered cake therefrom as it rotates, a chamber of which said blade forms one wall opening against the surface of said drum behind said blade to supply a recoating slurry to the drum, a slurry tank hydraulically connected with said chamber and both said slurry tank and chamber being hydraulically isolated from the liquid in said second tank, a conduit connecting said slurry tank with said compartment to supply fluid to the slurry tank, means for supplying solid filter aid to said slurry tank to form said slurry with said fluid, and means in said slurry tank for causing the said slurry to circulate therein and in said chamber to hold the solids in the slurry in suspension.

5. In combination; first and second tanks hydraulically connected at their bottoms, means in said first tank forming a compartment having a liquid level above the normal level in said tanks, a rotary perforate drum in said second tank, lying wholly below the said normal level a pump having its inlet connected with the inside of said drum and its outlet connected with said compartment, a scraper blade bearing on said drum to remove residue and a portion of the filter cake therefrom as it rotates, a chamber of which said blade forms one wall opening against the surface of said drum behind said blade to supply a recoating slurry to the drum, a slurry tank hydraulically connected with said chamber, a conduit connecting said slurry tank with said compartment to supply fluid thereto, means for supplying solid filter aid to said slurry tank to form said slurry with said fluid, and means in said slurry tank for causing said slurry to circulate in said slurry tank and chamber to hold the solids in the slurry in suspension, said chamber including means for causing the circulatory slurry flow therein to take place over the surface of said drum thereby preventing an over accumulation of filter aid at the drum.

6. In a filter, a rotatable filter drum, means energizable for driving said drum, a scraper blade bearing on the cake on said drum to remove a portion thereof as said drum rotates, a chamber immediately behind said blade to supply a slurry of recoating material to the surface of said drum to replenish the cake removed by said scraper, a feeler in said chamber adapted to engage the surface of the cake on the drum therein, and means controlled by said feeler operable to prevent energization of said drum driving means when said cake is less than a predetermined thickness and to bring about energization of said driving means when said cake is equal to or greater than said predetermined thickness.

7. In a filter, a rotatable cake supporting filter drum, means energizable for driving said drum, scraper means bearing on said cake to remove a portion thereof as said drum is driven, a chamber immediately behind said blade to supply a slurry of recoating material to said drum to replenish the cake removed by said scraper, a feeler in said chamber adapted to engage the surface of the cake on the drum therein, means continuously oscillating said feeler toward and away from the surface of the cake on said drum, and means operated by said feeler and responsive to the thickness of the cake on the drum in said chamber for controlling the energization of the driving means for said drum.

8. In a filter; a rotatable cake supporting filter drum and driving means therefor, circumferentially spaced scraper blades bearing on the surface of the cake on said drum and defining therebetween a slurry chamber to supply fresh cake forming material to the surface of the drum, an oscillating feeler in said chamber for periodically feeling the cake on the drum, a switch controlled by said feeler and operable when said cake is less than a predetermined thickness to interrupt the energizing circuit of said driving means, holding means to retain said circuit interrupted during the retracting movement of said feeler, and means to make said holding means ineffective on the next feeling movement of said feeler.

9. In a filter; a rotatable cake supporting filter drum and driving means therefor, circumferentially spaced scraper blades bearing on the surface of the cake on said drum and defining therebetween a slurry chamber, an oscillating feeler in said chamber for periodically feeling the cake on the drum, a contactor in circuit with said driving means, means responsive to a feeling movement of said feeler when said cake is less than a predetermined thickness to actuate said contactor to prevent energization of said driving means, a holding circuit for said contactor to maintain it in actuated position during the retraction movement of said feeler following the actuation of said contactor, and means for interrupting said holding circuit on the next feeling movement of said feeler.

10. In a filter; a rotatable cake supporting filter drum and driving means therefor, circumferentially spaced scraper blades bearing on the surface of the cake on said drum and defining therebetween a slurry chamber, an oscillating feeler in said chamber for periodically feeling the cake on the drum, a contactor in circuit with said driving means de-energizable to energize said driving means and energizable to halt said driving means, means responsive to a feeling movement of said feeler when said cake is less than a predetermined thickness for energizing said contactor, a holding circuit for said contactor, and means for interrupting said holding circuit on each feeling stroke of said feeler.

11. In a filter having a filter drum adapted to support a filter cake, circumferentially spaced scraper blades bearing on said cake to remove a portion thereof as said drum rotates, a chamber between said blades opening against said drum to supply a slurry of recoating material thereto, a feeler in said chamber for detecting the thickness of said cake, driving means for said drum, and control means for said driving means controlled by said feeler whereby said driving means becomes energized only when said cake is greater than a predetermined thickness, a continuously operating propelling means for causing movement of the slurry in said chamber, and means for increasing the speed of operation of said propelling means when said driving means is energized.

12. In a filter having a filter drum adapted to support a filter cake, circumferentially spaced scraper blades bearing on said cake to remove a portion thereof as said drum rotates, a chamber between said blades opening against said drum to supply a slurry of recoating material thereto, an oscillating feeler in said chamber for periodically detecting the thickness of said cake, driving means for said drum and control means therefor controlled by said feeler whereby asid driving means becomes energized only when said cake is greater than a predetermined thickness, a slurry tank connected with said chamber, an agitator in said tank, a drive motor for said agitator, and means responsive to the energization of said driving means for changing the energization of said drive motor.

13. In a filter; a drum adapted to support a filter cake and drive motor for the drum, a pump connected to draw fluid from said drum, cake renewing means for said drum comprising scraper means and a chamber opening against said drum to supply a slurry of recoating material thereto, detector means in said chamber riding on the surface of the cake on the drum for detecting the cake thickness in the chamber, control means for said drive motor operated by said detector means when the said cake reaches a predetermined thickness to energize said drive motor, a tank connected with said chamber for supplying a slurry of recoating material to the chamber, means for supplying liquid and dry cake forming material to said tank to make the said slurry, and means responsive to the flow rate through said pump for controlling the said supplying means for the dry cake forming material.

14. In a filter; a rotatable cake supporting drum, a drive motor for said drum, a pump connected to draw fluid from said drum, a scraper blade extending the length of said drum and operable to remove a part of the cake therefrom when said drum rotates, a slurry tank having a recoating chamber part opening against the surface of said drum immediately following said blade, a dispenser to supply dry cake forming material to said tank, means to supply fluid to said tank to form a slurry with said dry material therein, a feeler in said chamber part engaging the surface of the cake on the drum to detect the thickness of the cake, control means connected with said feeler and operable to energize said drive motor when said cake reaches a predetermined thickness, and means responsive to a predetermined minimum discharge rate of said pump for actuating said dispenser.

15. In a filter; a rotatable cake supporting drum, a drive motor for said drum, a pump connected to draw fluid from said drum, a scraper blade extending the length of said drum and operable to remove a part of the cake therefrom when said drum rotates, a tank having a recoating chamber part opening against the surface of said drum immediately following said blade, a dispenser to supply dry cake forming material to said tank, means to supply fluid to said tank to form a slurry with the dry material therein, a feeler in said chamber part engaging the surface of the cake on the drum therein to detect the thickness of the said cake, control means for said drive motor connected with said feeler and operated thereby to energize said drive motor when said cake reaches a predetermined thickness, and means responsive to a predetermined minimum discharge rate of said pump for actuating said dispenser, and to a discharge rate of said pump greater than said predetermined rate for halting the action of said dispenser.

16. In a filter; a rotatable cake supporting drum, a drive motor for said drum, a pump connected to draw fluid from said drum, a scraper blade extending the length of said drum and operable to remove a part of the cake therefrom when said drum rotates, a recoating chamber immediately following said blade and a slurry tank hydraulically connected therewith, a dispenser to supply dry cake forming material to said tank, means to supply fluid to said tank to form a slurry therein with said dry material, a feeler in said chamber resting on the surface of the cake on the drum therein to detect the thickness of the cake, control means for said drive motor connected with said feeler and operated thereby to energize said drive motor when said cake reaches a predetermined thickness, means responsive to a predetermined minimum discharge rate of said pump for actuating said dispenser, and to a discharge rate of said pump greater than said predetermined rate for halting the action of said dispenser, and agitator means in said tank for maintaining the dry material dispensed by said dispenser in suspension with said fluid.

17. In a drum type vacuum filter; having a rotatable perforated drum mounted on a horizontal axis and adapted for supporting a filter cake when a vacuum is drawn on said drum, a pump connected to draw a vacuum on said drum, a perforated flexible member of substantially the same width as the drum passing around the lower part of said drum and normally spaced therefrom, and means operative when said pump is running for maintaining said member spaced from said drum, said means being operable when said pump is halted for automatically moving said flexible member toward said drum to engage and support the cake thereon.

18. The method of operating a drum type vacuum filter wherein the said drum is rotatably suspended submerged in the fluid to be filtered and a vacuum is drawn thereon to induce fluid flow through the drum comprising; sealing off a part of the periphery of the drum from the fluid in which the drum is submerged, presenting a part of the filtered fluid drawn through the drum to the sealed off part of the outside surface of the drum, adding filter aid to the fluid so presented to build up a cake on the said part of the drum, rotating the drum when the cake on the said part reaches a predetermined thickness thereby to carry another portion of the drum to the re-presented fluid, and halting the addition of filter aid to the re-presented fluid whenever the flow rate through the drum reaches a predetermined value.

19. The method of operating a drum type vacuum filter wherein the drum is rotatably supported submerged in the fluid to be filtered and a vacuum is drawn on the drum to induce fluid flow therethrough comprising; sealing off a part of the periphery of the drum, presenting a slurry of cake forming material to the said part of said drum, rotating the drum when the cake built up on the said part thereof exceeds a predetermined thickness, increasing the concentration of the slurry when the flow rate through said drum falls below a predetermined amount, and scraping off at least a part of the cake from the drum immediately ahead of the area to which said slurry is presented.

20. The method of operating a drum type filter wherein a cake supporting drum is submerged in the fluid to be filtered and a vacuum is drawn on the interior of the drum to induce fluid flow through the cake thereon comprising; sealing off a portion of the peripheral extent of the drum from the fluid to be filtered by spaced scraper elements of which the leading is closer to the drum surface than the trailing and supplying liquid to the sealed off portion, adding cake forming material to the said liquid whenever the flow rate through the drum is below a predetermined amount, rotating the drum when the cake formed on the sealed off portion exceeds a predetermined thickness, and halting the addition of material to the said liquid when the flow rate through the drum again reaches the said predetermined amount, whereby said filter is maintained in continuous operation.

21. The method of operating a drum type filter wherein a cake supporting drum is submerged in the fluid to be filtered and a vacuum is drawn on the interior of the drum to induce fluid flow through the cake thereon comprising; rotating the drum, scraping the drum at spaced points therearound, adding new cake to the drum between said points by applying a slurry of filter aid thereto, rotating the drum when the new cake built up thereon is equal to or greater than a predetermined thickness, and varying the concentration of the cake forming slurry inversely to the changes in the rate of fluid flow through said cake.

22. The method of filtering comprising; completely submerging a filtering member in fluid to be filtered, drawing a vacuum on one side of the member to induce fluid flow therein, sealing off a part of the outer surface of the other side of the member, supplying a recoating slurry to the member in the sealed off area whereby the vacuum on the other side of the member will draw fluid from the slurry and cause the solid material in the slurry to build a cake on the surface of the member, moving the member and the sealed off part relatively whenever the cake formed in the sealed off area reaches a predetermined thickness, adding dry cake forming material to the slurry when the flow rate through said member falls below a predetermined amount and halting the addition of solids to the slurry whenever the flow rate through said member exceeds said predetermined amount, and maintaining a head on said slurry above that of the fluid to be filtered thereby to prevent contamination of said slurry by the leakage of said fluid into the sealed off area.

ALBERT O. FINK.
DAVID E. BENCH.

REFERENCES CITED

The following references are of record in the file of this patent:

UNITED STATES PATENTS

| Number | Name | Date |
|---|---|---|
| 45,149 | Foote | Nov. 22, 1864 |
| 206,107 | Hatch | July 16, 1878 |
| 898,212 | Gaara et al. | Sept. 8, 1908 |
| 1,103,725 | Woodman | July 14, 1914 |
| 1,227,983 | Vallez | May 29, 1917 |
| 1,515,130 | Morrison | Nov. 11, 1924 |
| 1,579,171 | Zoul | Mar. 30, 1926 |
| 1,796,491 | Sweetland | Mar. 17, 1931 |
| 1,848,478 | Haug | Mar. 8, 1932 |
| 1,906,767 | Roberts | May 2, 1933 |
| 2,102,780 | Bielfeldt | Dec. 21, 1937 |
| 2,092,111 | Dons et al. | Sept. 7, 1937 |
| 2,473,270 | Adams | June 14, 1949 |

FOREIGN PATENTS

| Number | Country | Date |
|---|---|---|
| 339,636 | Great Britain | Dec. 8, 1930 |
| 805,309 | France | Nov. 17, 1936 |